C. L. CHESTER.
SPRAYER.
APPLICATION FILED FEB. 12, 1910.

988,079.

Patented Mar. 28, 1911.
2 SHEETS—SHEET 1.

Witnesses:—
Samuel Payne
K. H. Butler

Inventor
C. L. Chester
by Attorneys.

THE NORRIS PETERS CO., WASHINGTON, D. C.

C. L. CHESTER.
SPRAYER.
APPLICATION FILED FEB. 12, 1910.
988,079.
Patented Mar. 28, 1911.
2 SHEETS—SHEET 2.
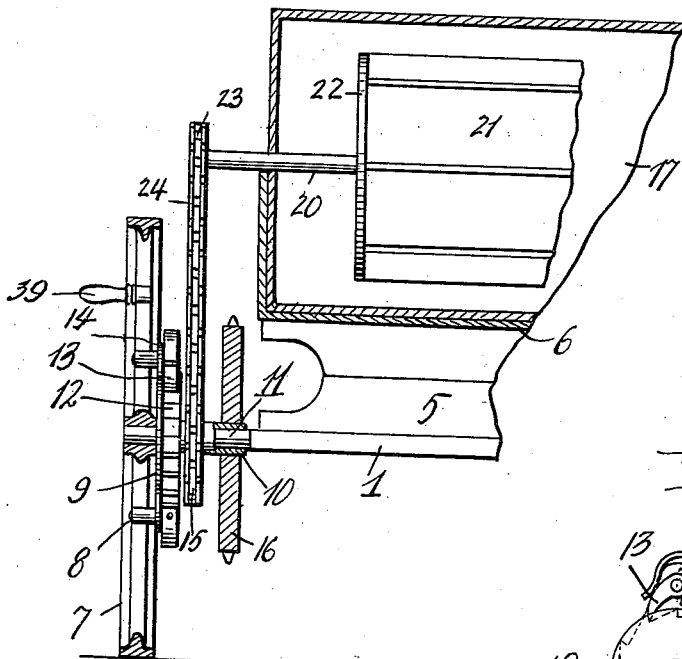
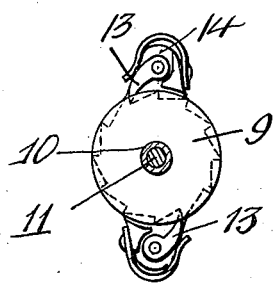
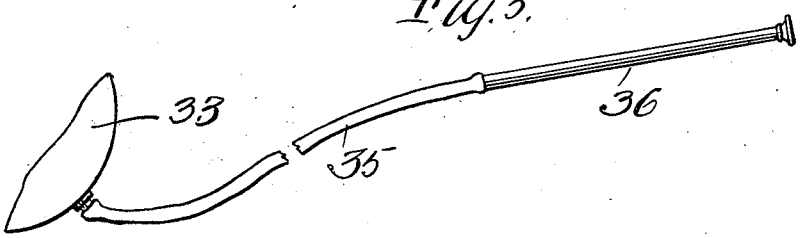
Witnesses:—
Samuel Payne
R. H. Butler
Inventor
C. L. Chester,
by
Attorneys:—

UNITED STATES PATENT OFFICE.

CHRISTIAN L. CHESTER, OF MONESSEN, PENNSYLVANIA.

SPRAYER.

988,079.

Specification of Letters Patent.  Patented Mar. 28, 1911.

Application filed February 12, 1910. Serial No. 543,627.

*To all whom it may concern:*

Be it known that I, CHRISTIAN L. CHESTER, a citizen of the United States of America, residing at Monessen, in the county of Westmoreland and State of Pennsylvania, have invented certain new and useful Improvements in Sprayers, of which the following is a specification, reference being had therein to the accompanying drawing.

This invention relates to sprayers of that type used in orchards, vineyards and gardens for destroying fungi that has attacked plants or trees.

The primary object of my invention is to provide a power spraying apparatus that will be operated by a movement of the vehicle or trucks upon which the apparatus is mounted, thereby obviating the necessity of using a gasolene engine or similar source of power for operating the apparatus.

Another object of this invention is to utilize compressed air for spraying a solution of Paris green, arsenate of lead, miscible oil or various kinds of insecticides or fungicides upon trees and plants to destroy fungi and various kinds of pests that prey upon trees and plants and eventually kill the same or destroy the fruit thereof.

A further object of the invention is to provide an apparatus that can be easily operated over a very small area, the apparatus being simple in construction, durable, inexpensive to manufacture, easily cleaned and maintained in an operable condition, and highly efficient as a spraying apparatus.

With these and such other objects in view as may hereinafter appear, the invention consists of the novel construction, combination and arrangement of parts to be hereinafter specifically described in detail and then claimed.

Reference will now be had to the drawings forming a part of this specification, wherein there is illustrated a preferred embodiment of the invention, but it is to be understood that the structural elements thereof can be varied or changed, as to the size, shape and manner of assemblage without departing from the scope of the appended claim.

Figure 1:
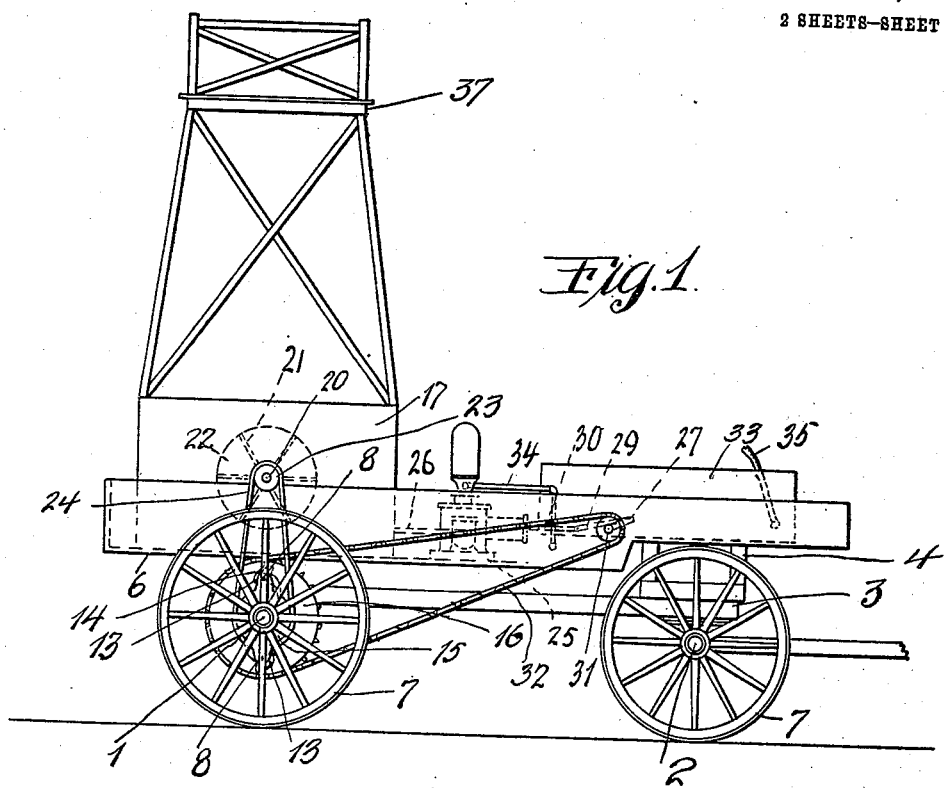
Figure 2:
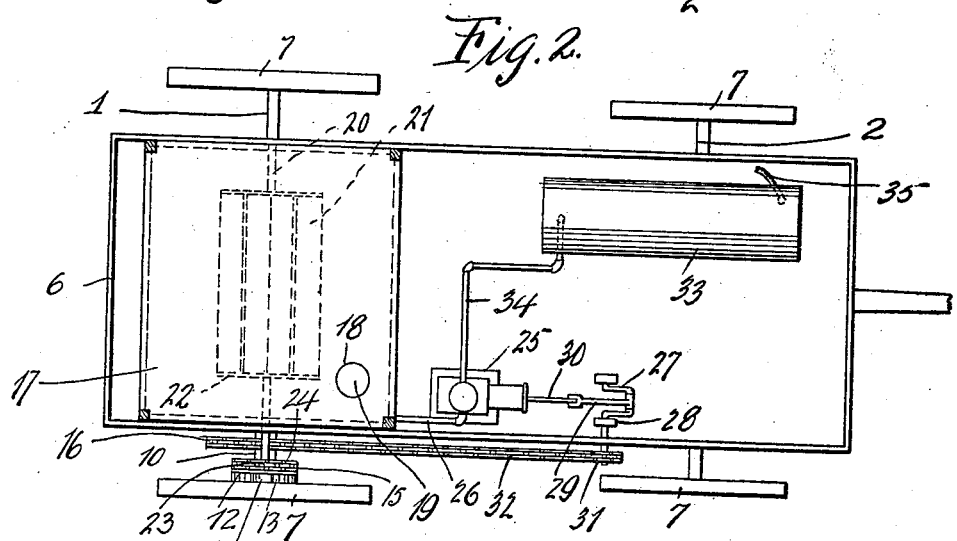

In the drawings:—Figure 1 is a side elevation of a spraying apparatus constructed in accordance with this invention, Fig. 2 is a plan of the same, Fig. 3 is an enlarged cross sectional view of a portion of the spraying apparatus, Fig. 4 is a side elevation of a ratchet mechanism adapted to form part of the apparatus, and Fig. 5 is a plan of a portion of a spraying tube and nozzle adapted to form part of the apparatus.

To put my invention into practice, I use a suitable vehicle and upon the vehicle I mount a reservoir or tank, a liquid pump, a compressed air tank or receiver, a permanent scaffolding or super-imposed platform, and a mechanism adapted to be actuated by a movement of the vehicle for agitating the contents of the reservoir or tank and operating the liquid pump.

The vehicle comprises a rear axle 1, a forward axle 2, a fifth wheel 3, bolsters 4 and 5, a vehicle bed or body 6 and wheels 7. One of the wheels upon the rear axle 1 has secured to the spokes thereof, as at 8 a bearing plate 9 and journaled in said bearing plate is a sleeve 10 which surrounds the spindle 11 of the axle 1 and loosely revolves thereon. The sleeve 10 adjacent to the bearing plate 9 is provided with a ratchet wheel 12 adapted to be engaged by oppositely disposed spring pressed pawls 13 pivotally carried by extensions 14 of the plate 9. Upon the sleeve 10 are also mounted sprocket wheels 15 and 16, the smaller being of a less diameter than the latter.

In the rear end of the vehicle bed or body 6 is located a rectangular reservoir or tank 17 having a suitable filling opening 18 adapted to be closed by a plug or cap 19. Revolubly mounted transversely of the reservoir or tank 17 is a shaft 20 provided with radially disposed blades or agitators 21 having the ends thereof connected by circular heads 22. One end of the shaft protrudes from the reservoir or tank 17 and is provided with a small sprocket wheel 23. Over this sprocket wheel and the wheel 15 is adapted to travel an endless sprocket chain 24, whereby when the sleeve 10 is revolved, the contents of the reservoir or tank will be thoroughly agitated and the ingredients of the contents commingled to such extent as to form a solution that can be easily pumped and sprayed.

Adjacent to the reservoir or tank 17 there is located a liquid pump 25, this pump being of a conventional form adapted to pump a liquid. The pump is connected by a pipe 26 to the reservoir or tank 17, and said pump is adapted to be operated by a crank shaft 27 journaled in bearings 28, carried by the bed or body of the vehicle. The crank shaft 27 is connected by a pitman 29 to the pump piston 30, and upon said shaft is mounted a sprocket wheel 31 over which is adapted to pass an endless sprocket chain 32 which also travels over the large sprocket wheel 16. The sprocket wheel 31 is located upon the outer end of the crank shaft 27, whereby the sprocket chain 32 can extend upwardly along the side of the bed or body.

In the vehicle bed or body 6 is mounted an air tank or reservoir 33, which is partly filled with air. This air tank or receiver has one end thereof connected by a pipe 34 to the pump 25, while the opposite end of the tank or receiver is connected by a hose or flexible connection 35 to a nozzle 36. Erected upon the reservoir or tank 17 is a permanent scaffolding or super-imposed platform 37, and the hose 35 is of sufficient length, whereby the nozzle 36 can be manipulated by an operator upon the platform 37. The wheel 7 carrying the bearing plate 9 has one of the spokes thereof provided with a crank handle 39, the object of which will presently appear.

During the movement of the vehicle, the agitator within the reservoir or tank 17 is operated, also the pump 25, whereby as the contents of the tank or reservoir 17 are agitated, the contents will be pumped into the air tank or receiver 33 and compress the air therein, and it is the air under compression that forces the spraying solution from the tank 33 through the hose 35 and the nozzle 36.

As long as the air within the tank 33 is under compression, the spraying solution can be distributed, and should the air within the tank assume its normal pressure, it is only necessary to move the vehicle in a circular manner to again supply the solution to the tank 33 and compress the air therein. For instance, with one of the rear wheels 7 standing practically stationary and the other rear wheel traveling around, the pump and agitator will be operated without changing the location of the vehicle.

From the foregoing it will be observed that I have devised novel means for distributing various kinds of solutions, without resorting to the use of power for pumping the same other than derived from the movement of the vehicle carrying the apparatus.

Having now described my invention what I claim as new, is:—

A portable spraying apparatus comprising a vehicle, a reservoir mounted thereon, a bearing plate carried by the spokes of one of the wheels of the vehicle, a sleeve mounted upon the axle of said wheel and provided with a ratchet, oppositely-disposed spring-pressed pawls carried by said plate and engaging the ratchet for rotating said sleeve, a pair of sprocket wheels carried by the sleeve, one being of greater diameter than the other, a shaft journaled in said reservoir and projecting from one end thereof, an agitator carried by the shaft, an operative connection between said sprocket wheel of smaller diameter and the projecting end of said shaft for driving the latter when said wheel is revolved, a pump carried by the vehicle and communicating with said reservoir, a crank shaft for operating the pump, an operative connection between said sprocket wheel of larger diameter and said crank shaft, a receiver carried by the vehicle and communicating with said pump and adapted to receive the contents of said reservoir, and means for discharging the contents of the receiver.

In testimony whereof I affix my signature in the presence of two witnesses.

CHRISTIAN L. CHESTER.

Witnesses:
  LUCY P. WHITNEY,
  GEO. P. SCHURZEN.

---

Copies of this patent may be obtained for five cents each, by addressing the "Commissioner of Patents, Washington, D. C."